Jan. 27, 1959
R. S. WILLIS
2,870,629
APPARATUS FOR MOVING AN ELEMENT INTO AND
FORM A VESSEL CONTAINING FLUID
UNDER PRESSURE
Filed Jan. 18, 1956
3 Sheets-Sheet 1
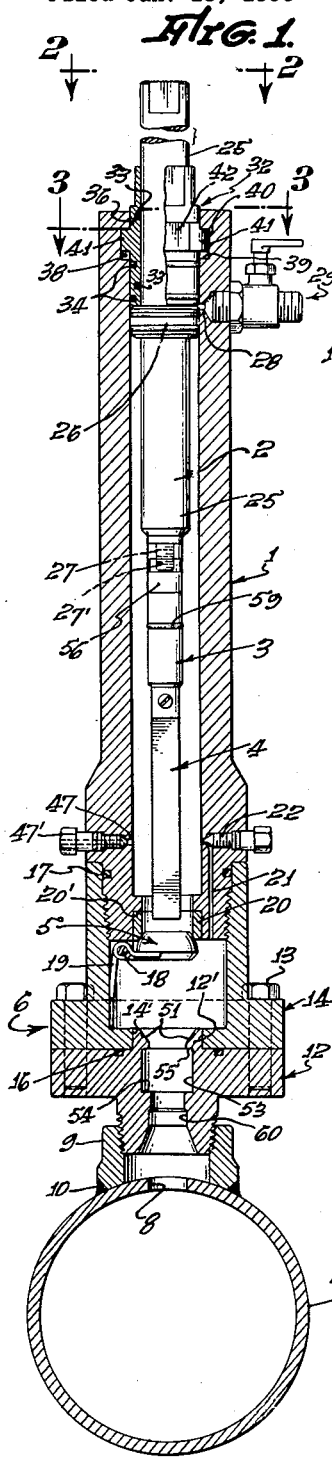
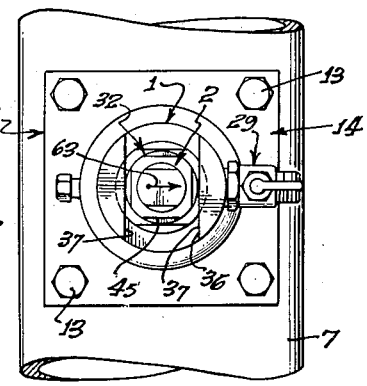
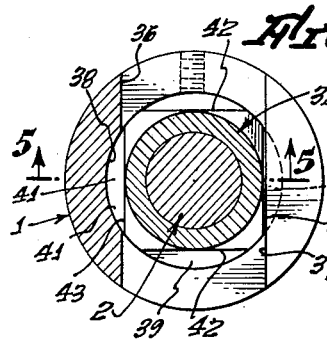
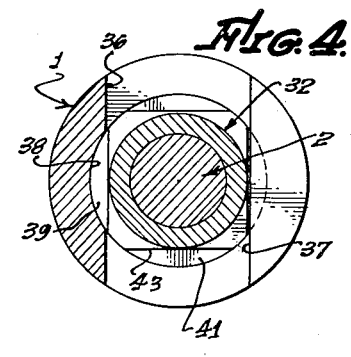
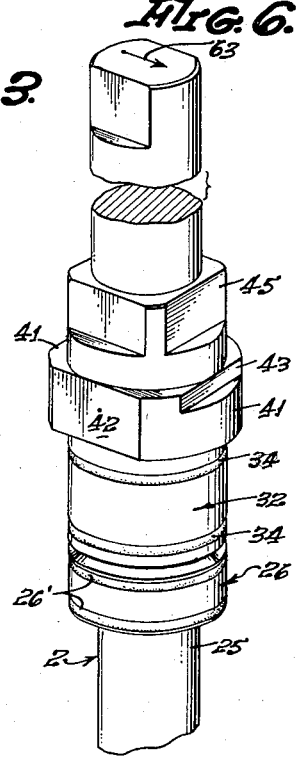
Robert S. Willis,
INVENTOR.
BY Paul A. Weilein
ATTORNEY.

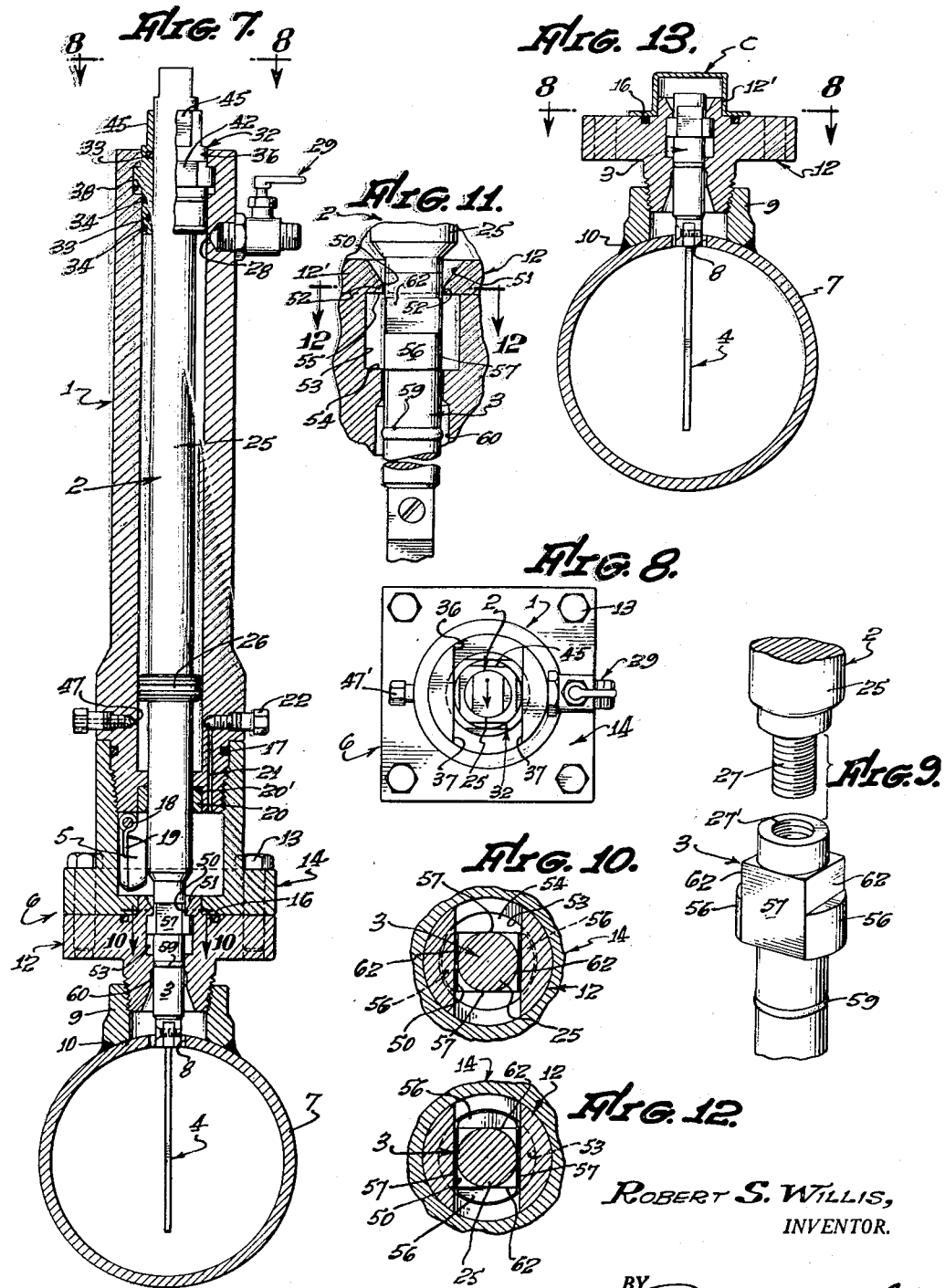

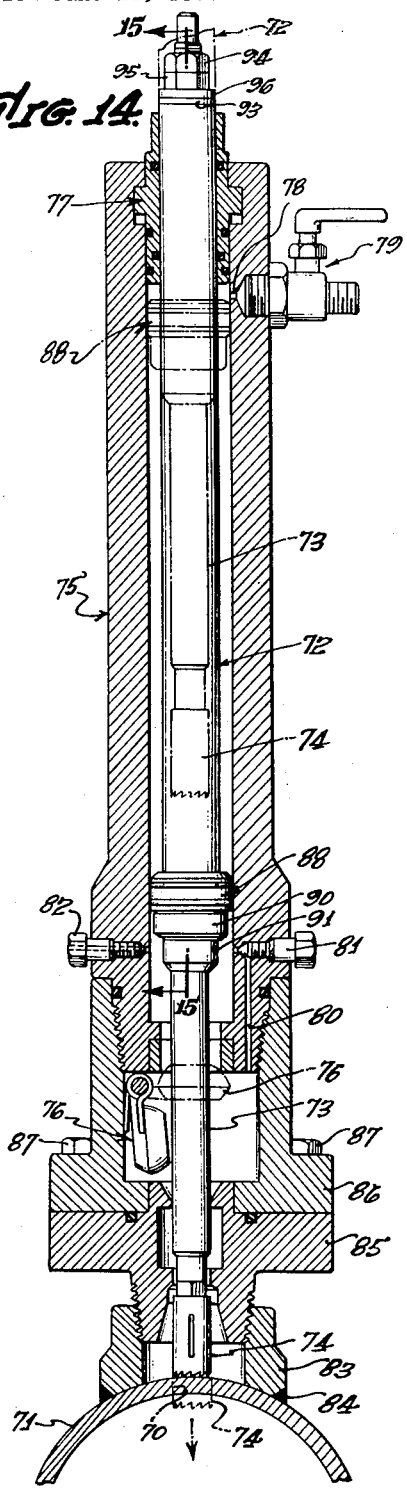

United States Patent Office 2,870,629
Patented Jan. 27, 1959

2,870,629

APPARATUS FOR MOVING AN ELEMENT INTO AND FROM A VESSEL CONTAINING FLUID UNDER PRESSURE

Robert S. Willis, Long Beach, Calif., assignor, by direct and mesne assignments, of ninety-seven and one-half percent to Willis Oil Tool Co., Long Beach, Calif., a corporation of California, and two and one-half percent to Elmer L. Decker, Long Beach, Calif.

Application January 18, 1956, Serial No. 560,019

21 Claims. (Cl. 73—86)

This invention relates to apparatus for moving an element into and from a vessel containing fluid under pressure. More particularly it relates to apparatus for facilitating the making of tests in pipe lines, conduits and other vessels, for example, the lines and vessels employed for transmitting and storing fluid petroleum products under pressure.

Pipe lines and vessels for transmitting or storing fluid petroleum products under pressure are subject to erosion, electrolytic attack and other damage due to the acidity, turbulence and other effects of such fluid. Accordingly, it is desirable to make tests along such lines and in such vessels so that proper corrective measures may be taken and the lines or vessels replaced before they become damaged to the extent making them unfit or unsafe for continued use.

Apparatus of the type to which the present invention relates forms the subject matter of my pending application for U. S. Letters Patent, Serial No. 301,181, filed July 28, 1952, now Patent No. 2,783,644.

It is an object of this invention to provide improved apparatus of this type which may be operated in a particularly efficacious and reliable manner to insert an element into and remove it from a vessel containing fluid under pressure without loss of the fluid.

It is another object of this invention to provide improved apparatus such as described which is operable to move a test element into and from a vessel containing fluid under pressure in a particularly novel manner such that fluid pressure derived from the vessel may be utilized to facilitate operation of the apparatus.

It is another object of this invention to provide apparatus such as described which in one form may be operated to drill an opening in a wall of a vessel containing fluid under pressure, without loss of the fluid. Such an opening will permit of use of apparatus embodying the present invention for placing a test element in and removing it from the vessel. Moreover, the formation of the opening will make it possible to take samples of the fluid or to inject any element or matter into the vessel with the use of apparatus embodying the present invention.

It is another object of this invention to provide in apparatus such as described a novel means for utilizing the fluid pressure from the vessel, after an opening is formed therein, for effecting removal of the element that has been moved into the vessel.

It is another object of this invention to provide apparatus in which novel locking means is actuated by fluid pressure in the vessel for releasably holding the test element within the vessel responsive to movement of the test element into a predetermined position.

It is another object of this invention to provide a novel cylinder unit in which optionally, a piston-like carrier for a drill or a piston-like carrier for a test element may be actuated to drill a hole in the wall of the vessel and to insert a test element or any other element into the vessel respectively.

It is a further object of this invention to provide novel means for detachably connecting the cylinder unit such as described to a vessel, for example, a pipe line for transmitting fluid petroleum products under pressure, whereby, after positioning a test element in the line and locking it in place therein, the cylinder unit may be detached for use in the placement of other test elements at desired points along the line. This connecting means and the cylinder unit also make it possible readily to couple the cylinder unit to the line and operate the unit for removing the test elements to determine the results of the tests.

It is another object of this invention to provide in apparatus such as described, a novel by-pass means for utilizing the fluid pressure derived from the vessel to aid in the opening of a check valve in the cylinder as the piston-like carrier is moved to position the test element in the vessel, as well as for moving the carrier to remove the test element from the vessel.

A further object of this invention is to provide apparatus such as described in which a piston-like carrier operable in the cylinder unit, has one end extended from the cylinder for manipulation. In the case of the carrier for the test element, manipulation of this extended end makes possible a fluid-pressure-effected locking of the test element in testing position in the vessel. In the case of the carrier for the drill, this extended end makes it possible to operate the drill with a power actuated drive means.

This invention possesses many other advantages and has other objects which may be made more easily apparent from a consideration of several embodiments of the invention. For this purpose there are shown two forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

In the accompanying drawings:

Fig. 1 is a longitudinal sectional view of apparatus embodying the present invention as attached to a pipe line containing fluid under pressure;

Fig. 2 is an enlarged end elevation of the apparatus, looking in the direction of the arrows 2—2 of Fig. 1;

Fig. 3 is an enlarged fragmentary sectional view taken on the line 3—3 of Fig. 1, showing the sealing means in locked position;

Fig. 4 is a fragmentary sectional view corresponding to Fig. 3 showing the sealing means in an unlocked position;

Fig. 5 is an enlarged fragmentary sectional view taken on the plane of line 5—5 of Fig. 3, but showing the sealing means in position preliminary to being locked;

Fig. 6 is an enlarged fragmentary perspective view of the sealing means and outer end of the piston-like carrier, removed from the cylinder;

Fig. 7 is a longitudinal sectional view of the apparatus as it would appear when positioning the test element in the pipe line, with the test element holder locked in place;

Fig. 8 is an end elevation of the apparatus on an enlarged scale, looking in the direction of the arrows 8—8 of Fig. 7;

Fig. 9 is a fragmentary perspective view of the inner end of the carrier and the holder for the test element as detached one from the other;

Fig. 10 is a sectional view on an enlarged scale taken on the line 10—10 of Fig. 7;

Fig. 11 is a fragmentary sectional view of the test element holder and associated parts showing the holder as initially inserted the full extent and preliminary to being turned into position to be locked;

Fig. 12 is a sectional view taken on the line 12—12 of Fig. 11;

Fig. 13 is a sectional view corresponding to the lower end of Fig. 7 showing the test element locked in place in the vessel and the cylinder unit removed therefrom;

Fig. 14 is a longitudinal sectional view of a modified form of the invention for drilling an opening in the pipe line; and Fig. 15 is an enlarged fragmentary sectional view partly in elevation taken on the line 15—15 of Fig. 14 of the carrier for the drill.

One embodiment of this invention generally includes a cylinder 1, a piston-like carrier 2 reciprocable in the cylinder; a holder 3 for a test element 4 detachably connected with the carrier, a check valve 5 in the cylinder and means, generally designated 6, for detachably connecting the cylinder with a vessel 7 for containing fluid under pressure. The vessel 7, as here shown, represents a pipe line for transmitting fluid under pressure, for example, petroleum or a fluid petroleum product.

The test element 4 is here shown in the form of a metal strip of the same composition as the valve forming the vessel 6, and may be of the same thickness as the metal forming the vessel. After this element has been positioned in the vessel for a predetermined test period, it is removed and inspected to ascertain the effect, if any, that the particular fluid has had on the metal of the vessel, whereby proper corrective measures may be effected. It is obvious that other types of test elements or sampling elements may be inserted and removed in accordance with this invention.

The attaching means 6 provides for communication of the bore of the cylinder 1 with the interior of the vessel 7 through an opening 8 in the vessel, whereby the test element 4 may be moved into and from the vessel in a manner which will be hereinafter fully described.

Referring more specifically to the apparatus, it is seen that the attaching means 6 includes an internally screw threaded nipple 9 welded as at 10 to the vessel 7 in registry with the opening 8. This attaching means includes a flanged tubular section 12 detachably secured by means of bolts 13 to a flanged tubular section 14. The section 12 is internally threaded and screwed into the nipple 9 whereas the section 14 is internally screw threaded and connected with the threaded inner end of the cylinder 1 as an extension of the cylinder. A sealing ring 16 is interposed between the abutting flanges of the tubular sections 12 and 14. A similar sealing ring 17 is disposed between the telescopically engaged portions of the cylinder 1 and tubular section 14 respectively.

The valve 5 is pivoted as at 18 on the inner end of the cylinder 1 and is biased by a spring 19 to engage a valve seat 20 mounted in the bore of the cylinder 1 and bearing against a shoulder 20'. The pressure of the fluid entering the tubular members 12 and 14 from the vessel 7 urges the valve 5 against the seat 20.

A novel valved by-pass means is provided in the cylinder 1 for equalizing the pressure on the valve 5 so that the valve readily may be opened by contact of the test element 4 therewith, it only being necessary to overcome the force of the spring 19 in this opening of the valve. This by-pass means also makes it possible to apply fluid pressure from the vessel for moving the piston-like carrier. Accordingly, a passage 21 is formed in the wall of the cylinder 1 so as to by-pass the valve 5, there being a valve 22 mounted on the cylinder 1 and operable exteriorly thereof to open and close the passage 21. When the valve 22 is unseated fluid pressure from the outer tubular section 14 will be effective through passage 21 and in the bore of the cylinder 1 for the purposes stated.

The piston-like carrier 2 includes a rod 25 having a piston portion 26 intermediate the ends thereof. The inner end 27 of the rod 25, as shown in Fig. 9, is reduced and screw threaded for effecting a detachable connection thereof with the threaded socket 27' in the holder 3 for the test element 4, whereby after the element 4 is positioned and locked in place in the vessel, the carrier 2 and the cylinder 1 may be detached to leave the holder and test element in the position shown in Fig. 13, wherein the test element is held in the vessel 7.

In assembling the apparatus the carrier 2 with the holder 3 and test element attached thereto is inserted into the cylinder to occupy the position shown in Fig. 1. When thus positioned, the holder 3 and test element 4 are adjacent the valve 5, whereas the piston portion 26 of the carrier is disposed between a port 28 in the outer end portion of the cylinder and the valve 5. A valved nipple 29 is connected with the port 28 to provide for introducing fluid under pressure from a suitable source, not shown, into the cylinder 1 through the port 28, as well as for relieving fluid pressure from the cylinder.

Sealing means are provided between the rod 25 of the carrier 2 and the wall of the cylinder bore adjacent the outer end of the cylinder 1. This sealing means includes a sleeve 32 surrounding the rod 25 and is adapted to be releasably locked in the cylinder. Sealing rings 33 and 34 are provided internally and externally of the sleeve 32 to seal against the rod 25 and the wall of the cylinder bore respectively.

The sleeve 32 and the cylinder 1 are constructed so that when the sleeve is turned about its axis to a predetermined position, it may be moved responsive to fluid pressure into a position in which the sleeve is locked in the bore of the cylinder. Accordingly, the outer end of the cylinder 1 is provided with a transverse groove 36 forming opposed axially disposed shoulders 37. The cylinder bore adjacent the shoulder 37 is counterbored as at 38, thereby providing inner and outer laterally disposed stop shoulders 39 and 40 axially spaced in the counterbore. The sleeve 32 is provided on opposite sides between its ends with laterally extended flanges 41 and flattened axially extended portions 42. The flattened portions 42 make it possible to insert the sleeve between the shoulders 37 on the cylinder so that the flanges 41 will enter the counterbore 38, these flanges coming to rest against the annular shoulder 39. Upon now turning the sleeve 32 about its axis, the flanges 41 are brought beneath the outer stop shoulders 40, as shown in Fig. 5. Upon introducing fluid under pressure into the cylinder 1, the sleeve 32 is moved outwardly by this fluid pressure from the position shown in Fig. 5 to the locked position shown in Figs. 1 and 3, whereby axially extending shoulders 43 on the sleeve 32 will contact the shoulders 37, thereby preventing the turning of the sleeve and locking it in place. In this locked position of the sleeve 32, the outer faces of the flanges 41 abut the outer stop shoulders 40, as shown in Fig. 1, thereby preventing outward axial movement of the sleeve from the cylinder.

The outer end of the sleeve 32 extends beyond the outer end of the cylinder 1 so that the sleeve may be turned into and from locking position when it is disposed with the shoulders 43 inwardly spaced from the shoulders 37 as shown in Fig. 5. The outer end of the sleeve 32 is of non-circular cross section as at 45, whereby a wrench or other tool may be applied thereto for the turning of the sleeve.

A bleed port 47 controlled by a valve 47' is provided in the cylinder 1 between the valve 5 and the innermost point in the cylinder bore reached by the piston portion 26 of the carrier 2.

With the apparatus assembled as shown in Fig. 1, it is seen that upon opening the by-pass valve 22, fluid pressure from the vessel 6 will be effective alike against opposite sides of the valve 5 by reason of the by-pass passage 21. When the fluid pressure is effective between the seated valve 5 and the piston 26 on the carrier 2, the carrier will be moved outwardly sufficiently to cause the piston portion 26 to contact and move the sleeve 32 into the position in which it is locked in the cylinder. The outer end of the piston 26 is bevelled and the sealing rings 26' so located on the piston that when the piston is moved to lock the sleeve 32, as shown in Fig. 1, the port 28 is still uncovered, whereby fluid pressure entering from the port at a higher pressure than the pressure in the vessel 6, will be effective to move the piston 26 so that the carrier 2 is inwardly advanced in the cylinder. As the carrier 2 is thus advanced, the test element 4 engages and opens the valve as it is moved into the vessel 6 to the position shown in Fig. 11.

It is desired to provide for detachment of the cylinder 1 and carrier 2 after the test element 4 is positioned in the vessel 6, thereby leaving the holder 3 and test element in the position shown in Fig. 13. This makes it possible to use the cylinder-carrier unit for placement or removal of other test elements, thereby making it unnecessary to have a separate cylinder-carrier unit for each test element disposed in testing position. Accordingly, means are provided for locking the test element in the vessel. To this end the test element holder 3 and the tubular member 12 fixed to the vessel 6 are provided with locking elements corresponding to the locking elements on the sealing sleeve 32 and outer end of the cylinder 1 respectively, and actuated by fluid pressure in the vessel in substantially the same manner as the sleeve 32. The tubular member 12 is provided with an annular boss 12' which is seated in a reduced portion 14' of the bore in the tubular member 14. The boss 12' is provided with a transverse groove 50 which intersects the bore through the boss and provides a pair of beveled wall portions 51 and opposed shoulders 52 inwardly of the beveled portions, the shoulders 52 extending axially of the boss. The bore through the member 12 has a large counterbore 53 which forms axially spaced and laterally disposed stop shoulders 54 and 55 inwardly of the shoulders 52. The holder 3 for the test element 4 is provided intermediate its ends with an enlarged portion defining a pair of laterally extending flanges 56 and a pair of flat sides 57. The flat sides 57 make it possible to move the flanges 56 between the beveled portions 51 and the shoulders 52 into the counterbore 53. Initially the flanges 56 contact the annular shoulder 54 at the bottom of the counterbore 53, as shown in Fig. 11. When the holder 3 is in the position shown in Fig. 11, a sealing ring 59 thereon is disposed within an enlargement 60 of the bore in the tubular member 12 and therefore does not form a seal around the holder. Thus, at this time, the fluid pressure from the vessel will be effective through the bores of the tubular members 12 and 14 as well as in the cylinder 1 between the valve 5 and the tubular member 14.

The outer end of the rod 25 of the carrier 2 extends beyond the outer end of the sleeve 32 and is of non-circular cross section so that a wrench or other tool may be applied thereto for turning the carrier about its axis. This turning of the carrier is effected to move the flanges 56 on the holder 3 beneath the stop shoulders 55 in the tubular member 12, thereby positioning the holder 3 so that it may be forced outwardly with the carrier 2 into the locking position shown in Figs. 7 and 13. This locking of the holder 3 is effected when the axially extending shoulders 62 on opposite sides of the holder above the flanges 56 engage the axially extending shoulders 52, thereby locking the holder against being turned cut of the position in which the laterally extending flanges 56 engage the shoulders 55 at the outer end of the enlargement 53.

It is desired that the test element 4 be disposed with its flat faces parallel to the direction of flow of fluid in the vessel 6, when in testing position. A marking 63 on the outer end of the rod 25 of the carrier 2 is placed so that the operator may be guided in turning the rod 25, thereby to effect this positioning of the test element in the vessel 6.

It should be noted that when the holder 3 is locked in the position shown in Figs. 7 and 13, the sealing ring 59 is engaged with the wall of the bore through the member 12 so as to form a seal excluding the fluid pressure from passing from the vessel 7 into the cylinder 1.

*Operation*

When carrier 2, with the sealing sleeve 32, the holder 3, and the test element 4 thereon as a unit, has been placed in the cylinder, the sleeve has been turned into position to be locked and the cylinder has been connected as shown in Fig. 1, with the vessel 6, the by-pass valve 22 is opened. This will equalize the pressure on the valve 5 and cause the sealing sleeve 32 to be shifted outwardly into the locked position, all as hereinbefore described. Next, fluid pressure under a pressure greater than that in the vessel 7 is applied through the valved nipple 29 and the port 28 so as to be effective against the piston 26 to move the carrier 2 inwardly and dispose the test element 4 in the vessel. As the carrier 2 is being moved in this manner the test element 4 contacts the valve 5 and swings the valve open against the action of the spring 19, the valve being held open by contact with the rod 25 of the carrier. The by-pass valve 22 is then closed and as the carrier 2 nears the end of its inward stroke, fluid pressure is trapped between the piston 26 and the sealing ring 59 when the latter is in sealing engagement with the wall of the bore in the member 12 above the enlargement 60 of this bore. This trapped fluid is noted by reference to a gauge (not shown) in the supply line for the higher fluid pressure supplied through the valved nipple 29, and may be relieved by opening the bleed valve 47' momentarily, then closing it. The application of the higher pressure fluid through the port 28 is then continued to move the holder 3 to the innermost position shown in Fig. 11. Next, the rod 25 is turned about its axis approximately 90° to position the test element 4 with its flat sides parallel to the direction of flow of fluid in the vessel as well as to position the holder with the flanges 56 aligned with and beneath the stop shoulders 55.

When the holder 3 is disposed at its innermost position, as shown in Fig. 11, the sealing ring 59 thereon is disposed in the non-sealing position in the enlarged portion 60 of the bore through the member 12. The by-pass valve 22 is now opened to permit the fluid pressure in the vessel 6 to become effective through the bores of the members 12 and 14, the by-pass 21, and in the cylinder 1 against the piston 26. However, at this time the higher pressure admitted through the port 28 holds the piston 26 against response to the pressure from the vessel 7, therefore, the valve 29 is opened to slowly relieve pressure against the outer side of the piston sufficiently to permit the pressure effective through the by-pass 21 to move the piston 26 and carrier 2 whereby the holder 3 is moved outwardly into the locked position shown in Fig. 7. When the holder is in this position, the opposed axially extending shoulders 62 and 52 cooperate to prevent rotative movement of the holder, while the flanges 56 engaging the stop shoulders 55 prevent axial movement of the holder in a direction away from the vessel. Thus the holder after being turned about its axis approximately 90 degrees when in its innermost position in the vessel, is moved axially into locked position responsive to fluid pressure derived from the vessel. When the holder is in this locked position the sealing ring 59 contacts the wall of the bore in the member 12, thereby shutting off the application of pressure from the vessel past the ring 59. Any pressure trapped between the piston 26 and the sealing ring 59 when the latter forms a seal in the bore of the member 12 may be relieved by opening the bleed valve 47'.

The cylinder 1 and the carrier 2 may be removed from connection with the member 12 and the holder 3 respectively. This is effected by turning the outer end of the carrier rod 25 to unscrew the end 27 of the rod from the holder 3 and then removing the screws 13 to detach the member 14 from the member 12. This leaves the holder 3 locked in the member 12, as shown in Fig. 13. The boss 12' provides for the mounting of a protective cap C on the member 12 to exclude dust and other foreign matter from entering the mouth of the bore in the member 12. When removed in this manner the cylinder 1 and carrier 2 therein may be used at other locations to insert and remove test elements with relation to the vessel 6 or similar vessels.

In preparing to remove the holder 3 and test element 4 thereon, the cap (if used) is removed and the tubular member 14 on the cylinder 1 is secured by means of the screws 13 to the member 12. Next, the bleed valve 47' is opened and the carrier 2 is pushed inwardly by hand and turned to threadedly connect the end 27 thereof with the holder 3. Following this connection of the carrier 2 with the holder 3, the bleed valve 47' is closed and fluid pressure is applied from the source not shown, through the valved nipple 29 and the port 28 so as to force the carrier downwardly and move the holder 3 into the lowermost position shown in Fig. 11. After this, the outer end of the rod 25 of the carrier 2 is turned by hand to move the flange 56 on the holder 3 into alignment with the groove 50, whereby the holder may be withdrawn from the bore of the tubular member 12. Upon now opening the by-pass valve 22 and then manipulating the valve 29 to slowly relieve pressure above the piston 26, the pressure of the fluid in the vessel 6 becomes effective to move the carrier 2, holder 3 and test element 4 into the position shown in Fig. 1. When the test element 4 is thus withdrawn into the cylinder 1, the spring 19 closes the valve 5. The bleed valve 47' is now opened, the by-pass valve 22 is closed and the valve 29 is opened to relieve the pressure between the outer end of the cylinder and the piston 20. The operator now pushes the sleeve 32 inwardly and turns the sleeve into unlocked position so that it may be withdrawn from the cylinder with the carrier and test element whereby the latter may be inspected.

A modified form of this invention, as shown in Figs. 14 and 15, provides for the drilling of an opening 70 in a vessel 71 containing fluid under pressure. Such an opening provides for the insertion and removal of an element, for example the test element 4, into the vessel as well as for removal of the test element. This modified apparatus is identical with the apparatus shown in Figs. 1-13, except that the piston-like carrier comprises an elongated cylindrical portion 72 and a sectional drill shaft 73 rotatable in the portion 72 and supporting a drill 74. Moreover, no part of the carrier or the drill 74 is locked in place in the vessel in this modified form in the manner of the holder 3, inasmuch as the drill is merely employed to drill the opening 70 and then removed from the vessel and the apparatus. Accordingly, this modified apparatus includes the cylinder 75, check valve 76, sealing sleeve 77, port 78, valve nipple 79 connected with port 78, by-pass 80, by-pass valve 81 and bleed valve 82, which are identical with the cylinder 1, check valve 5, sealing sleeve 32, and bleed valve 42', respectively, shown in Figs. 1-13.

The cylinder 75 is adapted to be coupled to a nipple 83 welded as at 84 to the vessel 71 over the point at which it is desired to form the opening 70. This coupling of the cylinder is provided for by means of two coupling members 85 and 86 corresponding to the coupling members 12 and 14, shown in Figs. 1-13. The coupling member 85 is threaded onto the nipple 83 and detachably secured by means of the screws 87 to the coupling member 86, which latter is threaded onto the cylinder 75.

The carrier 72 is provided with a piston 88 corresponding to the piston 26 in the first described form of this invention, but located on the inner end of the carrier. The piston 88 is provided with a bore in which a bushing 89 is mounted, the drill shaft 73 being extended through this bore and bushing. A thrust bearing 90 is confined on the shaft 73 between the piston 88 and a shoulder 91 at a joint 92 between sections of the shaft. At the outer end of the carrier 72 is a bushing 93 through which the shaft 73 extends. Nuts 94 and 95 are threaded on the outer end portion of the shaft 73 and bear upon a thrust washer 96 which abuts the outer end of the bushing 93. The outer end of the shaft 73 in effect, is a part of the carrier and adapted to be connected with any suitable means not shown, for rotating the shaft in the operation of drilling the hole 70 in the vessel 71.

The carrier 72 is positioned in the cylinder 75 and advanced to position the drill 74 against the vessel 71 in substantially the same manner as the carrier in the first described form of this invention. However, the by-pass valve 81 is not opened in this position of the carrier, as the valve 76 is opened by contact of the drill 74 therewith, when fluid pressure is applied through the valved nipple 79 and port 78 to advance the carrier in positioning the drill for operation. The sealing sleeve 77 is urged into locked position in the same manner as the sleeve 32 but by the fluid pressure directed into the cylinder through the port 78. During the inward movement of the carrier 72 to position the drill for operation, the bleed valve 82 is opened whereby the carrier may be moved freely. After the drill is positioned for operation, the bleed valve 82 is closed and the drill shaft is then rotated to drill the opening 70 in the vessel 71. Any fluid escaping when the opening 70 is formed by the drill, will be held in operation between the piston 88 and the vessel 71, as at this time the bleed port is closed.

After the opening 70 is formed, the carrier 72 is retracted to remove the drill 74 and position it within the cylinder 75. This is accomplished by slowly bleeding off the pressure between the piston 88 and the port 78 through manipulation of the valved nipple 79, while the fluid pressure from the vessel 71 is effective against the carrier. Although this pressure from the opening 70 is effective through the tubular members 85 and 86 to move the carrier outwardly, the by-pass valve 81 should also be opened in the operation of removing the drill, due to the fact that the check valve 76 will close when the drill moves outwardly past the check valve. The by-pass 80 will then supply to the cylinder the fluid pressure for continuing the outward movement of the carrier to the position shown in dotted lines in Fig. 14, while the operator slowly bleeds through the port 78 and valved nipple 79, the fluid pressure between the piston 88 and the port 78. When the carrier reaches the end of its outward stroke the by-pass valve 81 is closed and the bleed valve 82 is opened to relieve the pressure trapped between the piston 88 and the closed valve 76'. When all the pressure has been relieved through the valved nipple 79, the operator may remove the carrier and the drill 74 by pushing the sleeve 77 inwardly and turning it in the same manner as described in connection with the sleeve 32, whereby the sleeve 77 is free to be withdrawn with the carrier 72, drill shaft 73 and drill 74.

It will now be seen that after an opening has been formed in a wall of a vessel containing fluid under pressure with the apparatus shown in Figs. 14 and 15, and the carrier 72 and parts thereon are removed, the cylinder 75 and parts associated therewith, remain connected to the vessel. As this cylinder 75 and associated parts are the same as the cylinder 1 and parts thereon, it is apparent that the carrier 2, as shown in Figs. 1-13, may be inserted into the cylinder 75 and operated therein in the same manner as in the cylinder 2 to insert and remove the test element 4. Accordingly, the cylinder unit shown in Figs. 1-13, or in Figs. 14 and 15, may be used alike for drilling an opening in a vessel containing fluid under pressure and for inserting and removing a test element through such an opening.

I claim:

1. In apparatus for moving an element into and from a vessel containing fluid under pressure; a cylinder; means on one end of said cylinder for connecting the cylinder with the vessel; a check valve mounted in said cylinder to open toward said vessel; a carrier in said cylinder including a piston portion; means at the other end of said cylinder providing a seal between said carrier and said cylinder; means on said carrier for supporting an element to be moved into and out of said vessel; said carrier being movable in said cylinder between a first position in which said piston portion and said element are disposed between said sealing means and said valve, and a second position in which said element is moved past said valve into said vessel while said piston portion is disposed between said valve and said sealing means; means on the cylinder operable to introduce fluid under pressure between said piston portion and said sealing means as well as for relieving fluid pressure from between said piston portion and said sealing means; said carrier when in said second position engaging and holding said valve open; and valved by-pass means in said cylinder operable for introducing fluid under pressure from said vessel into said cylinder between said valve and said piston portion.

2. In apparatus for moving an element into and from a vessel containing fluid under pressure; a cylinder; means on one end of said cylinder for connecting the cylinder with the vessel; a check valve mounted in said cylinder to open toward said vessel; a carrier in said cylinder including a piston portion; means at the other end of said cylinder providing a seal between said carrier and said cylinder; means on said carrier for supporting an element to be moved into and out of said vessel; said carrier being movable in said cylinder between a first position in which said piston portion and said element are disposed between said sealing means and said valve, and a second position in which said element is moved past said valve into said vessel while said piston portion is disposed between said valve and said sealing means; means on the cylinder operable to introduce fluid under pressure between said piston portion and said sealing means as were as for relieving fluid pressure from between said piston portion and said sealing means; said carrier when in said second position engaging and holding said valve open; valved by-pass means in said cylinder operable for introducing fluid under pressure from said vessel into said cylinder between said valve and said piston portion; and means on said cylinder between said valve and said piston portion operable for relieving fluid pressure from said cylinder.

3. In apparatus for moving an element into and from a vessel containing fluid under pressure; a cylinder; means on one end of said cylinder for connecting the cylinder with the vessel; a check valve mounted in said cylinder to open toward said vessel; a carrier in said cylinder including a piston portion; means at the other end of said cylinder providing a seal between said carrier and said cylinder; means on said carrier for supporting an element to be moved into and out of said vessel; said carrier being movable in said cylinder between a first position in which said piston portion and said element are disposed between said sealing means and said valve, and a second position in which said element is moved past said valve into said vessel while said piston portion is disposed between said valve and said sealing means; means on the cylinder operable to introduce fluid under pressure between said piston portion and said sealing means as well as for relieving fluid pressure from between said piston portion and said sealing means; said carrier when in said second position engaging and holding said valve open; valved by-pass means in said cylinder operable for introducing fluid under pressure from said vessel into said cylinder between said valve and said piston portion; said sealing means including a sleeve surrounding said carrier and mounted in said cylinder for limited axial movement responsive to introduction of fluid pressure into the cylinder; and elements on said sleeve and cylinder respectively cooperable to lock said sleeve in said cylinder responsive to said axial movement of said sleeve.

4. In apparatus for moving an element into and from a vessel containing fluid under pressure; a cylinder; means on said cylinder for connecting one end of the cylinder with the vessel; said cylinder having a bore therethrough for reception of a piston-like carrier for an element to be moved into and from said vessel; means for providing a seal at the other end of said cylinder; a check valve mounted in said cylinder to open toward said vessel; means providing a valved by-pass around said valve in said cylinder; means on said cylinder between said valve and said sealing means for introducing fluid under pressure into said cylinder as well as relieving fluid pressure therefrom; means between said last named means and said valve for relieving fluid from said cylinder; said sealing means including a sleeve surrounding said carrier; a sealing element between said sleeve and said carrier; said sleeve being mounted in said cylinder for rotative and axial movement relative to said cylinder; a sealing element between said sleeve and said cylinder; said sleeve being axially movable in one direction relative to said cylinder responsive to fluid pressure in said cylinder; and locking elements on said sleeve and said cylinder respectively, cooperable to releasably lock said sleeve to said cylinder responsive to a predetermined rotative movement of said sleeve followed by a predetermined pressure-effected axial movement of said sleeve in said one direction.

5. In apparatus for moving an element into and from a vessel containing fluid under pressure; a cylinder; means on said cylinder for connecting one end of the cylinder with the vessel; said cylinder having a bore therethrough for reception of a piston-like carrier for an element to be moved into and from said vessel; means providing a seal at the other end of said cylinder; a check valve mounted in said cylinder to open toward said one end of the cylinder; means providing a valved by-pass around said valve in said cylinder; means on said cylinder between said valve and said sealing means for introducing fluid under pressure into said cylinder as well as relieving fluid pressure therefrom; means between said last named means and said valve for relieving fluid from said cylinder; said sealing means including a member axially movable in said cylinder responsive to fluid pressure in the cylinder; and elements on said axially movable member and said cylinder respectively, cooperable to lock said member in said cylinder responsive to said axial movement.

6. In apparatus for moving an element into and from a vessel containing fluid under pressure; a cylinder; a flanged tubular member at one end of said cylinder; a second flanged tubular member; fastening elements extending through the flanges of said tubular members for detachably joining said tubular members to one another; said second tubular member having means thereon providing for connection thereof with the vessel; said cylinder and said tubular members providing a bore extending from said vessel through the other end of said cylinder for reception of a piston-like carrier for moving an element into and from said vessel; a check valve arranged in said bore to open toward said vessel; said cylinder having a by-pass passage therein for by-passing said valve; means providing a seal at said other end of said cylinder; means on said cylinder for introducing between said valve and said sealing means fluid under pressure; means between said last named means and said valve for relieving fluid pressure from said cylinder; said sealing means including a sleeve surrounding said carrier and provided with sealing elements for engaging said carrier and said cylinder; said sleeve being removably mounted in said cylinder and movable axially therein in one direction responsive to said pressure in said cylinder; said sleeve being rotatable relative to said cylinder; and means operative to releasably lock the sleeve to the cylinder responsive to predetermined rotative movement of said sleeve followed by pressure-effected axial movement of said sleeve in said one direction; movement of said sleeve axially in the opposite direction upon reduction of fluid pressure acting against said sleeve, effecting the release of said sleeve for rotative movement and withdrawal from said cylinder.

7. In apparatus for moving an element into and from a vessel containing fluid under pressure; a cylinder; means at one end of said cylinder for connecting the cylinder with the vessel; an elongated carrier in said cylinder including a piston portion; a check valve mounted in said cylinder to open in a direction toward said vessel; means forming a seal at the other end of said cylinder between said carrier and said cylinder; means on the carrier for supporting an element to be moved into and from the vessel; said carrier being reciprocable in said cylinder between a first position in which said piston portion and said element are disposed between said valve and said sealing means, and a second position in which said element is disposed in said vessel while said piston portion remains between said valve and said sealing means; said carrier having its other end extended through said sealing means and outwardly from said cylinder for manipulation while said carrier is in said first and second positions; means for introducing fluid under pressure into said cylinder between said sealing means and said piston portion to move said carrier from said first position to said second position; said last named means being operable to relieve said pressure from said cylinder; said carrier engaging and opening said valve upon movement into said second position; and means for introducing fluid pressure into said cylinder between said piston portion and said vessel for moving said carrier from said second position to said first position.

8. In apparatus for moving an element into and from a vessel containing fluid under pressure; a cylinder; means at one end of said cylinder for connecting the cylinder with the vessel; an elongated carrier in said cylinder including a piston portion; a check valve mounted in said cylinder to open in a direction toward said vessel; means forming a seal at the other end of said cylinder between said carrier and said cylinder; means on the carrier for supporting an element to be moved into and from the vessel; said carrier being reciprocable in said cylinder between a first position in which said piston portion and said element are disposed between said valve and said sealing means, and a second position in which said element is disposed in said vessel while said piston portion remains between said valve and said sealing means; said carrier having its other end extended through said sealing means and outwardly from said cylinder for manipulation while said carrier is in said first and second positions; means for introducing fluid under pressure into said cylinder between said sealing means and said piston portion to move said carrier from said first position to said second position; said last named means being operable to relieve said pressure from said cylinder; said carrier engaging and opening said valve upon movement into said second position; means for introducing fluid pressure into said cylinder between said piston portion and said vessel for moving said carrier from said second position to said first position; and means operable on said cylinder between said valve and said piston portion for relieving fluid pressure from said cylinder.

9. Apparatus for moving a test element into and from a vessel containing fluid under pressure comprising: a cylinder; coupling means for detachably connecting one end of said cylinder with said vessel in registry with an opening in said vessel; a check valve mounted in said cylinder to open toward said vessel; spring means biasing said valve to closed position; a carrier in said cylinder including a piston portion intermediate the ends thereof; means at the other end of said cylinder providing a seal between said carrier and said cylinder; a holder for a test element detachably mounted on said carrier; a test element supported by said holder; said carrier being movable between a first position in which said piston portion, said holder and said element are disposed between said valve and said sealing means, and a second position in which said holder is disposed in said coupling means and said element is disposed in said vessel; said carrier engaging said valve and holding said valve open when the carrier is moved into said second position; means on the cylinder for introducing fluid under pressure into the cylinder between said piston portion and said sealing means to move said carrier from said first position to said second position; means on the cylinder for introducing fluid under pressure between said valve and said piston portion for moving said carrier from said second position to said first position; and means on said coupling means and said holder cooperable responsive to fluid pressure in said cylinder for locking said holder to said coupling means while said carrier is in said second position, whereby said cylinder and said carrier may be detached from said coupling means and said holder respectively.

10. Apparatus for moving a test element into and from a vessel containing fluid under pressure comprising: a cylinder; coupling means for detachably connecting one end of said cylinder with said vessel in registry with an opening in said vessel; a check valve mounted in said cylinder to open toward said vessel; spring means biasing said valve to closed position; a carrier in said cylinder including a piston portion intermediate the ends thereof; means at the other end of said cylinder providing a seal between said carrier and said cylinder; a holder for a test element detachably mounted on said carrier; a test element supported by said holder; said carrier being movable between a first position in which said piston portion, said holder and said element are disposed between said valve and said sealing means, and a second position in which said holder is disposed in said coupling means and said element is disposed in said vessel; said carrier engaging said valve and holding said valve open when the carrier is moved into said second position; means on the cylinder for introducing fluid under pressure into the cylinder between said piston portion and said sealing means to move said carrier from said first position to said second position; means operable on said cylinder for introducing fluid under pressure from said vessel into the cylinder between said valve and said piston portion for moving said carrier from said second position to said first position; and means on said holder and said coupling means cooperable to releasably lock said holder to said coupling means upon predetermined rotative movement of the holder followed by axial movement of said holder as effected when said carrier is moved into said first position.

11. Apparatus for moving a test element into and from a vessel containing fluid under pressure comprising: a cylinder; coupling means for detachably connecting one end of said cylinder with said vessel in registry with an opening in said vessel; a check valve mounted in said cylinder to open toward said vessel; spring means biasing said valve to closed position; a carrier in said cylinder including a piston portion intermediate the ends thereof; means at the other end of said cylinder providing a seal between said carrier and said cylinder; a holder for a test element detachably mounted on said carrier; a test element supported by said holder; said carrier being movable between a first position in which said piston portion, said holder and said element are disposed between said valve and said sealing means, and a second position in which said holder is disposed in said coupling means and said element is disposed in said vessel; said carrier engaging said valve and holding said valve open when the carrier is moved into said second position; means on the cylinder for introducing fluid under pressure into the cylinder between said piston portion and said sealing means to move said carrier from said first position to said second position; means operable on said cylinder for introducing fluid under pressure from said vessel into the cylinder between said valve and said piston portion for moving said carrier from said second position into said first position; and elements on said holder and said coupling means respectively, cooperable to lock said holder in said coupling means responsive to movement of said carrier into said first position whereby said cylinder and said carrier may be detached from said coupling means and said holder respectively.

12. Apparatus for moving a test element into and from a vessel containing fluid under pressure comprising: a cylinder; coupling means for detachably connecting one end of said cylinder with said vessel in registry with an opening in the vessel; a check valve mounted in said cylinder to open toward said vessel; spring means biasing said valve to closed position; a carrier in said cylinder including a piston portion intermediate the ends thereof; means at the other end of said cylinder providing a seal between said carrier and said cylinder; a holder for a test element detachably mounted on said carrier; a test element supported by said holder; said carrier being movable between a first position in which said piston portion, said holder and said element are disposed between said valve and said sealing means, and a second position in which said holder is disposed in said coupling means and said element is disposed in said vessel; said carrier engaging said valve and holding said valve open when the carrier is moved into said second position; means on the cylinder for introducing fluid under pressure into the cylinder between said piston portion and said sealing means to move said carrier from said first position to said second position; means embodied in said cylinder for introducing fluid under pressure from said vessel into said cylinder between said valve and said piston to equalize fluid pressure on said valve when said carrier is in said first position; and means releasably locking said holder to said coupling means responsive to movement of said carrier from said second position to said first position following a predetermined rotative movement of said carrier and said holder; said locking means releasing said holder responsive to predetermined rotative movement of said carrier and holder when said carrier and holder are in said second position.

13. Apparatus for making tests in a vessel containing fluid under pressure comprising: a cylinder; a tubular member detachably connected with one end of said cylinder and adapted to be connected with the vessel in registry with an opening in the vessel; a check valve mounted in said cylinder to open toward said vessel; spring means biasing said valve to close; a carrier including a piston portion reciprocable in said cylinder; a holder for a test element detachably connected with said carrier; said carrier being movable between a first position in which the piston portion and holder are disposed between the check valve and the other end of said cylinder, and a second position in which the holder is disposed in said tubular member and the test element is disposed in the vessel; said carrier engaging said valve and holding it open when moved into said second position; said cylinder having a passage by-passing said valve; a by-pass valve controlling said passage; means providing a seal at the other end of said cylinder between said carrier and the cylinder; said carrier having an end extended from said cylinder for manipulation to dispose said holder in a predetermined position in said coupling member; means for introducing fluid under pressure into said cylinder between said sealing means and said piston portion; said last named means being operable to relieve said pressure from said cylinder; said holder being movable axially in said tubular member responsive to fluid pressure from said vessel when fluid pressure between said piston and said sealing means is relieved from said cylinder; elements on said holder and said tubular member cooperable to lock said holder in said tubular member responsive to said axial movement of said holder; and means operable to exclude fluid pressure in the vessel from passing said holder into said cylinder when said holder is locked in said tubular member.

14. Apparatus for making an opening in the wall of a vessel containing fluid under pressure; comprising a cylinder; means for connecting one end of the cylinder with a wall of a vessel in which the opening is to be formed; a check valve mounted in said cylinder to close toward the vessel; spring means biasing said valve to closed position; a carrier including a piston portion reciprocable in said cylinder; means at the other end of said cylinder providing a seal between said carrier and said cylinder; a rotary shaft supported by said carrier; a drill on said shaft; said carrier being movable between a first position in which the drill and piston portion are disposed between said sealing means and said valve, and a second position in which said drill is disposed for drilling said opening in the wall of the vessel; said piston portion being between said valve and said sealing means when said carrier is in said second position; said carrier and said shaft being extended outwardly from said other end of said cylinder; means for introducing fluid under pressure into said cylinder between said sealing means and said piston portion, to move said carrier into said second position; said last named means being operable to relieve fluid pressure from said cylinder; said carrier engaging and opening said valve upon movement into said second position; means embodied in the cylinder for applying to said piston portion fluid pressure from said vessel after forming said opening said sealing means including a sleeve surrounding said carrier and removably and rotatably mounted in said cylinder; said sleeve being movable axially responsive to fluid pressure in said cylinder; and means on said sleeve and said cylinder cooperable to releasably lock said sleeve to said cylinder responsive to rotative movement and fluid pressure-effected axial movement of said sleeve.

15. Apparatus for making an opening in the wall of a vessel containing fluid under pressure; comprising a cylinder; means for connecting one end of the cylinder with a wall of a vessel in which the opening is to be formed; a check valve mounted in said cylinder to close toward the vessel; spring means biasing said valve to closed position; a carrier including a piston portion reciprocable in said cylinder; means at the other end of said cylinder providing a seal between said carrier and said cylinder; a rotary shaft supported by said carrier; a drill on said shaft; said carrier being movable between a first position in which the drill and piston portion are disposed between said sealing means and said valve, and a second position in which said drill is disposed for drilling said opening in the wall of the vessel; said piston portion being between said valve and said sealing means when said carrier is in said second position; said carrier and said shaft being extended outwardly from said other end of said cylinder; means for introducing fluid under pressure into said cylinder between said sealing means and said piston portion, to move said carrier into said second position; said last named means being operable to relieve fluid pressure from said cylinder; said carrier engaging and opening said valve upon movement into said second position; means embodied in the cylinder for applying to said piston portion fluid pressure from said vessel after forming said opening; said last named means including a passage in said cylinder by-passing said valve; a valve operable to open and close said passage; said sealing means including a sleeve surrounding said carrier and removably and rotatably mounted in said cylinder; said sleeve being movable axially responsive to fluid pressure in said cylinder; and means on said sleeve and said cylinder cooperable to releasably lock said sleeve to said cylinder responsive to rotative movement and fluid pressure-effected axial movement of said sleeve.

16. Apparatus for making an opening in the wall of a vessel containing fluid under pressure; comprising a cylinder; means for connecting one end of the cylinder with a wall of a vessel in which the opening is to be formed; a check valve mounted in said cylinder to close toward the vessel; spring means biasing said valve to closed position; a carrier including a piston portion reciprocable in said cylinder; means at the other end of said cylinder providing a seal between said carrier and said cylinder; a rotary shaft supported by said carrier; a drill on said shaft; said carrier being movable between a first position in which the drill and piston portion are disposed between said sealing means and said valve, and a second position in which said drill is disposed for drilling said opening in the wall of the vessel; said piston portion being between said valve and said sealing means when said carrier is in said second position; said carrier and said shaft being extended outwardly from said other end of said cylinder; means for introducing fluid under pressure into said cylinder between said sealing means and said piston portion, to move said carrier into said second position; said last named means being operable to relieve fluid pressure from said cylinder; said carrier engaging and opening said valve upon movement into said second position; means embodied in the cylinder for applying to said piston portion fluid pressure from said vessel after forming said opening; said last named means including a passage in said cylinder by-passing said valve; a valve operable to open and close said passage; a bleed valve on the cylinder for relieving fluid pressure between said valve and said piston portion said sealing means including a sleeve surrounding said carrier and removably and rotatably mounted in said cylinder; said sleeve being movable axially responsive to fluid pressure in said cylinder; and means on said sleeve and said cylinder cooperable to releasably lock said sleeve to said cylinder responsive to rotative movement and fluid pressure-effected axial movement of said sleeve.

17. In apparatus for moving an element into and from a vessel containing fluid under pressure, a cylinder; coupling means for communicating said cylinder with the interior of said vessel; a carrier reciprocable in said cylinder; a holder joined to said carrier for supporting said element; said holder being disposed in said coupling means when said element is in said vessel; and locking elements on said coupling means and said holder respectively, cooperable upon predetermined rotative movement of said carrier and holder as a unit, followed by predetermined axial movement of said carrier and holder in a direction away from said vessel, for releasably locking said holder against withdrawal from said coupling means; said locking elements releasing said holder upon axial movement of said carrier and holder toward said vessel followed by rotative movement of said carrier and holder.

18. In apparatus for moving an element into and from a vessel containing fluid under pressure, a cylinder; coupling means for communicating said cylinder with the interior of said vessel; a carrier reciprocable in said cylinder; a holder joined to said carrier for supporting said element; said holder being disposed in said coupling means when said element is in said vessel; locking elements on said coupling means and said holder cooperable upon predetermined rotative movement of said carrier and holder as a unit, followed by predetermined axial movement of said carrier and holder in a direction away from said vessel, for releasably locking said holder against withdrawal from said coupling means; said locking elements releasing said holder upon axial movement of said holder toward said vessel followed by rotative movement of said holder; and means on said carrier operable responsive to fluid pressure in said cylinder for effecting said predetermined axial movement of said carrier and holder in a direction away from said vessel; means for introducing fluid under pressure into said cylinder; said last named means maintaining said holder in said locked position while said fluid pressure is effective in said cylinder; and means for releasing said fluid pressure from said cylinder to permit said axial movement of said holder toward said vessel.

19. In apparatus for moving an element into and from a vessel containing fluid under pressure including a cylinder; coupling means for communicating said cylinder with the interior of said vessel; said coupling means having a bore therethrough; a carrier reciprocable in said cylinder; a holder joined to said carrier for supporting the element for movement through said bore into and from said vessel; locking elements on said coupling means and said holder cooperable to releasably lock said holder in said bore responsive to predetermined rotative movement of said holder followed by a predetermined axial movement of said holder in a direction away from said vessel; said locking elements releasing said holder upon predetermined axial movement of said holder toward said vessel followed by predetermined rotative movement of said holder; and means on said carrier operable responsive to fluid pressure supplied from said vessel through said bore to said cylinder for effecting said predetermined axial movement of said holder away from said vessel; said last named means maintaining said holder in said locked position while said fluid pressure is effective in said cylinder; and means for releasing said fluid pressure from said cylinder.

20. The apparatus as set forth in claim 19 wherein means on said holder seals said bore against passage of said fluid pressure from said vessel into said cylinder upon movement of said holder into said locked position; said last named means opening said bore for passage of said fluid pressure into said cylinder when said holder is moved from said locked position toward said vessel.

21. The apparatus as set forth in claim 19, wherein said bore has a counterbore therein; and a sealing ring arranged on said holder to be disposed in said counterbore so as to permit flow of fluid through said bore for introduction into said cylinder when said holder is in a predetermined position in said bore; said sealing means moving out of said counterbore into a position for sealing said bore against the flow of fluid past the sealing means when said holder is in said locked position.

References Cited in the file of this patent

UNITED STATES PATENTS

| | | |
|---|---|---|
| 660,760 | Mueller | Oct. 30, 1900 |
| 856,650 | Mueller | June 11, 1907 |
| 1,769,463 | Rice | July 1, 1930 |
| 2,035,472 | Hammond | Mar. 31, 1936 |
| 2,299,814 | Gale et al. | Oct. 27, 1942 |
| 2,351,764 | Jarrett | June 20, 1944 |